United States Patent
Lee (12)

(10) Patent No.: US 6,623,648 B2
(45) Date of Patent: Sep. 23, 2003

(54) OXIDATION CATALYST, METHOD FOR PREPARING THE SAME, METHOD FOR RECYCLING THE SAME AND METHOD FOR TREATING WASTEWATER USING THE SAME

(75) Inventor: Geun-Seok Lee, Seoul (KR)

(73) Assignee: ZEO-Tech. Co., LTD, Seoul (KR)

( * ) Notice: Subject to any disclaimer, the term of this patent is extended or adjusted under 35 U.S.C. 154(b) by 0 days.

(21) Appl. No.: 09/985,040

(22) Filed: Nov. 1, 2001

(65) Prior Publication Data

US 2002/0100734 A1 Aug. 1, 2002

(30) Foreign Application Priority Data

Dec. 5, 2000 (KR) .................................... 2000-0073387

(51) Int. Cl.$^7$ .................................................. C02F 1/72
(52) U.S. Cl. ...................... 210/758; 210/759; 210/760; 210/763; 210/908; 210/917
(58) Field of Search ................................. 210/758, 759, 210/760, 763, 908, 917; 252/175, 186.25, 186.33

(56) References Cited

U.S. PATENT DOCUMENTS 5,552,063 A * 9/1996 Yan
5,635,078 A * 6/1997 Yan
6,149,820 A * 11/2000 Pedersen

* cited by examiner

Primary Examiner—Betsey Morrison Hoey
(74) Attorney, Agent, or Firm—Young & Thompson

(57) ABSTRACT

Disclosed are an oxidation catalyst suitable for use in treatment of nonbiodegradable wastewater, a method for preparing the same, a method for recycling the same and a method for treating wastewater using the same. The oxidation catalyst comprises an activated carbon support having surface reformed with a tin compound, in the form of particles, powders and pellets, and metal ions impregnated to surface of the support. The preparation method of the oxidation catalyst comprises reforming surface of an activated carbon support in the form of particles, powders and pellets, impregnating various metal ions to surface of the support, drying the metal-impregnated support, and sintering the metal-impregnated support. In addition, the recycling method of the oxidation catalyst comprises drying the oxidation catalyst used for treatment of nonbiodegradable wastewater, and warming-up at 50–100° C. in a double boiler or sintering at 150–500° C. in a furnace the dried oxidation catalyst.

8 Claims, No Drawings

OXIDATION CATALYST, METHOD FOR PREPARING THE SAME, METHOD FOR RECYCLING THE SAME AND METHOD FOR TREATING WASTEWATER USING THE SAME

BACKGROUND OF THE INVENTION

1. Field of the Invention

The present invention relates, in general, to a method for treating nonbiodegradable wastewater, and in particular, to an oxidation catalyst having various metal activities capable of effectively treating wastewater, a method for preparing the same, a method for recycling the same and a method for treating wastewater using the same.

2. Description of the Prior Art

With advances in the industry, various pollutants are produced and their components become nonbiodegradable and highly-concentrated. So, effective treatment of such pollutants has become a main concern.

Further, an allowed discharge standard for pollutants has become more and more stringent owing to serious environmental pollution. However, most wastewater treatment plants treat waste pollutants only by flocculation treatment and a biological method called an activated-sludge method, and thus, do not satisfy such discharge standards.

Toxic compounds contained in wastewater are nonbiodegradable and so are difficult to biologically decompose. Therefore, most pollutants are discharged in the non-decomposed state, thus aggravating water quality as well as creating diverse problems in biological treatment. Thus, there is an urgent need for development of a process capable of effectively treating such wastewater.

In general, such toxic pollutants are chemically treated with an oxidizing agent or a reducing agent and converted to harmless materials. But most of them are chemically stable and not easily reacted with oxidizing or reducing agents.

With the intention of readily performing oxidation or reduction reactions, the temperature or pressure of reaction conditions is increased and thus the reaction may be carried out under super critical state.

However, high treatment costs are required to meet such conditions, so economic loss occurring.

Of the wide range of pollutants, cyanides which are very poisonous and nonbiodegradable substances, are contained in industrial wastewater. In common methods for treating such cyanides, there is provided an alkaline chlorine method, in which cyanide-containing wastewater is adjusted to pH 11–12 and then treated with chlorine as an oxidizing agent.

But this method is disadvantageous in that there are many difficulties in handling chlorine gas, and chlorine is reacted with other materials in treating wastewater under unsuitable conditions, thus producing additional toxic compounds.

In order to overcome the problems of treatment methods of nonbiodegradable wastewater, methods for performing redox reactions using a catalyst are developed. A representative oxidation treatment is the Zimmermann process treating wastewater in the presence of an oxygen gas at high temperature under high pressure [J. Chem. Eng. 65, 117, (1959)]. Thereafter, there has been much improvement in such techniques. Recently, it was reported that toxic wastewater was treated at 150–250° C. under 10–70 atm to become harmless, at Nippon Shokubai Co., LTD and Osaka Gas Co., LTD [Harada Yoshiaki, Shokubai, 35 (5), 289, (1993)].

However, these techniques suffer from the disadvantages of high treatment costs attributed to reaction conditions, such as the high pressure of 50 atm and high temperatures of 100–300° C., and expensive equipment capable of withstanding high temperature and high pressure. So, in the treatment of large quantities of wastewater, economic loss arises.

Therefore, a catalytic oxidation process, which can be carried out under the conditions of room temperature and atmospheric pressure, is required. An oxidation method using liquid catalyst, such as Fenton oxidation method, is widely used. But this method has the drawback that, since the used catalyst is made to be precipitated and then removed, large amounts of sludge are generated, thus requiring additional processes for removing the sludge.

Meanwhile, through high strength oxidation treatment methods widely known in recent years, radicals having high oxidability are produced from an oxidizing agent and allow various pollutants in water to be oxidized, in which the useful radical is the OH radical having high oxidability, produced from the decomposition of hydrogen peroxide or ozone. Such method includes $H_2O_2/UV$, $H_2O_2/ozone$, $H_2O_2/ozone/UV$ and so on.

However, the above method suffers from high initial costs and high operation costs, because of additional equipment, such as UV lamps or an ozone generator.

So, there is proposed a method for removing hazardous components through catalytic treatment of ozone oxidation (WO 81/02887). But the treatment rate and durability of the catalyst was not satisfactory. In addition, a treatment method of wastewater using a water-treatment catalyst obtained by using various transition metals to ozone and honeycomb-shaped $TiO_2$—$ZrO_2$ is devised (Korean Pat. Publication No. 94-6404, No. 3685), but the catalyst having the structure limited to a honeycomb shape is unsuitable for use in the treatment of wastewater, since it mainly functions deodorization and sterilization.

Meanwhile, in another method of treating waste water, $TiO_2$ is attached to particles or powders of activated carbon and are used as a UV light catalyst (Application No. 2000-0031391). However, this method is inappropriate for use in treating nonbiodegradable wastewater, because of carrying out merely weak oxidations to the extent of antibiosis and sterilization by adsorbing microorganism or fungi.

As conventional oxidation catalysts, $TiO_2$ or inorganic material have been used, but they have no surface-adsorption. Also, when activated carbon is used as a supporting material, adsorption of activated carbon and oxidation of catalyst are responsible only for deodorization or antibiosis. So, it cannot be applied to oxidation catalyst for wastewater treatment.

SUMMARY OF THE INVENTION

Accordingly, an object of the present invention for alleviating the problems as described above is to provide an oxidation catalyst capable of treating wastewater through oxidation reaction without secondary pollution.

It is another object of the present invention to provide a semi-permanent catalyst having the same efficiency as a new catalyst, even though the catalyst is reused through a sintering process.

It is another object of the present invention to provide a catalyst capable of oxidizing various nonbiodegradable and toxic components and decreasing color intensity in wastewater.

It is another object of the present invention to provide an oxidation catalyst having high durability and excellent catalytic action of the surface, by reforming the surface of activated carbon to increase the attachability of metal and impregnating various metals to the surface.

It is another object of the present invention to provide a catalyst which can effectively remove an oxidizing agent, such as hydrogen peroxide or ozone present in the treated water after an oxidation reaction.

It is a further object of the present invention to provide a method for preparing the oxidation catalyst.

It is a still further object of the present invention to provide a method for recycling the oxidation catalyst.

It is a still further object of the present invention to provide a method for treating wastewater using the oxidation catalyst.

DETAILED DESCRIPTION OF THE INVENTION

To achieve the objects of the present invention, the present invention provides an oxidation catalyst comprising a metal impregnated to a reformed surface of an activated carbon support, said metal being any one of a transition metal, an alkali metal, an alkali earth metal, or mixtures thereof selected from the group consisting of Rn, Al, Sn, Pb, Se, Zn, Fe, Cd, Cr, Mn, Ti, Mg, Co, Ca, Ba, Sr, Ni and Pd.

In addition, the present invention provides an oxidation catalyst characterized in that the support comprises various activated carbon materials, such as coconut and rice bran.

Also, the present invention provides an oxidation catalyst characterized in that the activated carbon is in the form of particles, pellets or powders.

Also, the present invention provides an oxidation catalyst characterized in that surface of the activated carbon is reformed with a tin compound.

Further, the present invention provides a method for treating nonbiodegradable wastewater using the oxidation catalyst and an oxidizing agent, such as $O_3$, $H_2O_2$, $O_2$, or air.

Furthermore, the present invention provides a method for recycling the oxidation catalyst, so as to economically treat wastewater.

Based on the present invention, an oxidation catalyst is made up of an activated carbon which is useful as a support in the form of particles, pellets or powders, having an increased attachability of a metal by reforming the surface of the support, and any metal element of transition metal, an alkali metal or an alkali earth metal impregnated to the above surface.

The activated carbon materials are exemplified by coconut, rice bran and so on.

The metal element impregnated to the support is selected from the group consisting of transition metals, alkali metals and alkali earth metals, such as Rn, Al, Sn, Pb, Se, Zn, Fe, Cd, Cr, Mn, Ti, Mg, Co, Ca, Ba, Ni, or Pd.

As for the oxidation catalyst, a weight ratio of the impregnated metal and the support is 0.0001–100%, and preferably 0.1–10%.

Below, a detailed description will be given for a method for preparing the oxidation catalyst according to the present invention.

Above all, an activated carbon provides for the support. As such, the usable activated carbon can be any type of particles, pellets or powders, and comprises various materials, such as rice bran and coconut.

Next, surface of the activated carbon is reformed with a tin compound (0.02% w/v), thereby increasing attachability of metal ions.

The metal elements, which will be impregnated to the support, are mixed with an aqueous solution or an organic solvent to yield a mixed solution, which is then immersed with the support.

No matter what type the impregnated metal is, it must be either dissolved in water or an organic solvent. It is preferred that the metal compound is in the form of chlorides or nitrates. In addition, palladium compounds or phosphate compounds are added in the ratio of 0.01% w/v to the above mixed solution, whereby attachability of the metal to the support can be enhanced.

During the immersing procedure, the synthetic catalyst, composed of the metal elements impregnated to the activated carbon support, can be obtained.

The synthetic catalyst is subjected to a filtering process and then a drying process over air, so as to separate it from an aqueous solution or an organic solvent.

The synthetic catalyst is warmed-up in a double boiler at 50–100° C. or sintered at 100–500° C. in a furnace. Thereby, the preparation process of an oxidation catalyst according to the present invention is completed.

Thusly prepared oxidation catalyst is used for wastewater treatment process, and then separated, dried and warmed to 50–100° C., or sintered at 150–500 ° C., thus being able to reuse it.

Hence, the oxidation catalyst of the present invention can be semi-permanently used, thus creating an economic benefit.

The present catalyst after subjected to surface reformation can effectively absorb ozone or hydrogen peroxide remaining after a reaction and thus is advantageous in terms of reusability for oxidation.

Then, using the oxidation catalyst and a sprayer of the above oxidizing agent, methods for treating wastewater, such as leachate, cyanide-containing wastewater and colored wastewater, are carried out according to the following procedure.

First, leachate of a filled-in land was treated by the oxidation catalyst of the present invention. The results are given in Table 1, below.

TABLE 1

| | Sample | | | |
| --- | --- | --- | --- | --- |
| | 1 | 2 | 3 | 4 |
| PH | 8.3 | 8.6 | 8.6 | 8.7 |
| Alkalinity (mg/L) | 3,550 | 3,700 | 3,550 | 2,050 |
| $COD_{Cr}$ (mg/L) | 806 | 556 | 478 | 212 |
| $COD_{Mn}$ (mg/L) | 416 | 305 | 225 | 90 |
| $BOD_5$ (mg/L) | 59 | 14.5 | 7 | 3.8 |
| TOC (mg/L) | 481 | 453 | 360 | 187 |
| $NH_3$—N (mg/L) | 565 | 620 | 582 | 331 |
| $NO_2$—N (mg/L) | 7.5 | 0 | 0.2 | 0.1 |
| $NO_3$—N (mg/L) | 48.1 | 43.8 | 47.7 | 104.5 |
| $PO_4$—P (mg/L) | 3.0 | 2.1 | 2.8 | 2.5 |
| Color Intensity (CU) | 2,345 | 622 | 494 | 72 |

In the above table, sample 1 shows raw wastewater and its columns designate the concentration of each pollutant in the wastewater.

Sample 2 means the treated water generated at the rate of 5 L/min in batch operation by treating 10 L of raw wastewater with 1 g of ozone per hour for 30 minutes. Concentrations of the pollutants remaining in the treated water are shown in columns.

Sample 3 was obtained by subjecting 10 L of raw wastewater to ozone reaction and simultaneously catalytic reaction using the oxidation catalyst of the present invention for 30 minutes.

In the sample 3, the ozone reaction and the catalytic reaction were processed with ozone at 1 g/hr and thus the treated water was generated at the rate of 5 L/min in a batch operation.

In sample 4, wastewater was continuously treated (hydraulic retention time 2 hours) using the oxidation catalyst of the present invention. The amount of ozone consumed per 1 m$^3$ of leachate wastewater was 0.1–0.126 kg.

As can be seen in the above table 1, continuous treatment for hydraulic retention time of 2 hours results in a very high removal rate of organic matters.

$COD_{Cr}$ and $BOD_5$ were decreased by 73.7% and 93.6%, respectively.

Nitrogen was treated by 41.4% and color intensity was decreased by 96.9%, thus showing very high treatment efficiency.

Second, cyanide-containing wastewater is treated as follows.

In order to treat cyanide-containing wastewater, hydrogen peroxide was used as an oxidizing agent. The cyanide-containing wastewater and oxidizing agent were fed in a molar ratio of 1:1 into a batch reactor, after which they were treated in the presence of the present oxidation catalyst incorporated with 2 g/L of Fe. The results are shown in Table 2, below. As such, the reaction was carried out at 10, pH of cyanide-containing wastewater itself, under room temperature (20° C.) and atmospheric pressure (1 atm).

TABLE 2

|  | Raw Water | No Catalyst (t = 30 min.) | Activated Catalyst | | |
| --- | --- | --- | --- | --- | --- |
|  |  |  | (t = 5 min.) | (t = 10 min.) | (t = 30 min.) |
| Cyanide Con. (mg/L) | 500 | 420 (16%) | 142 (71.6%) | 112 (77.6%) | 850 (73%) |
| Remaining H$_2$O$_2$ (mg/L) | 500 | 380 | 75 | 42 | 30 |

In the above table 2, the term "no catalyst" means that the wastewater was treated with only hydrogen peroxide as an oxidizing agent, and "activated catalyst" shows that the wastewater was treated with the oxidation catalyst prepared according to the present invention.

From the above table, it can be found that, when the cyanide-containing wastewater is treated with only hydrogen peroxide without a catalyst, cyanide is hardly removed and its removal rate is very slow.

However, use of the present catalyst results in a treatment efficiency of 70% or more within 2–3 minutes. In addition, the remaining hydrogen peroxide was consumed at 85% or more. During the reaction time 30 minutes, 83% of cyanide was treated and 94% of hydrogen peroxide was consumed, thus there is little remaining hydrogen peroxide.

Therefore, the treatment of cyanide-containing wastewater using the oxidation catalyst of the present invention leads to drastically shortened treatment times and use of much smaller treatment apparatus, compared to treatment of the wastewater using only hydrogen peroxide.

Third, colored wastewater is treated according to the following procedure.

Into a 10 L of colored wastewater-containing reactor, 2% (w/w) of Fe-impregnated oxidation catalyst was charged and hydrogen peroxide as an oxidizing agent was continuously introduced at a molar ratio of 0.4 to $COD_{Cr}$. Such a continuous operation was performed for 240 hours (10 days) (retention time 2 hours). The results are presented in the following table 3.

TABLE 3

|  | Raw Water | Operation Time | | | | |
| --- | --- | --- | --- | --- | --- | --- |
|  |  | 6 hr | 24 hr | 96 hr | 168 hr | 240 hr |
| $COD_{Cr}$ (mg/L) | 830 | 112 (85.3%) | 148 (82.2%) | 210 (74.7%) | 286 (65.5%) | 350 (57.8%) |
| Color Intensity (CU) | 2500 | 82 (96.7%) | 195 (92.2%) | 488 (80.5%) | 745 (70.2%) | 890 (64.4%) |

After 96 hours (4 days), the organic matters were removed in the amount of 75% and the color intensity of the wastewater was decreased by 80%. So, the catalyst can be effectively used for treatment of colored wastewater.

The catalyst used in the above experiment was separated, and warmed to 50–100° C. in a double boiler or sintered at 150–500° C. for 6 hours, and then allowed to stand and cool. Thusly obtained catalyst was then reused, and the results are shown in Table 4, below.

As such, the oxidation experiment was carried out in a batch operation, and the colored wastewater was treated under the same conditions as the above table 3 (HRT=2 hr, introduction of 2 g/L catalyst).

TABLE 4

|  | Raw Water | No Catalyst | Recycled Catalyst | New Catalyst |
| --- | --- | --- | --- | --- |
| $COD_{Cr}$ (mg/L) | 830 | 710 (14.5%) | 198 (76.1%) | 124 (85.0%) |
| Color Intensity (CU) | 2500 | 1750 (29.2%) | 210 (91.6%) | 78 (96.9%) |

When the present catalyst was not used, very small treatment efficiency was obtained. Whereas, when the used catalyst was sintered and then reused, treatment efficiency of organic matters were in the order of 89.5% and the colored wastewater became clearer due to a recovery efficiency of 94.5%, compared to a new catalyst.

Even though the saturated or polluted catalyst was sintered and then reused, very high regeneration efficiency can be obtained.

Hence, the catalyst of the present invention can be recycled and semi-permanently used, and thus economic benefit occurs.

As mentioned above, when wastewater is treated using the activated catalyst prepared according to the present invention and an oxidizing agent-feeding equipment, organic matters, dyes and toxic materials present in wastewater can be effectively treated, even at room temperature under atmospheric pressure. So, wastewater can be easily treated without expensive equipment and thus there is an economic benefit.

The oxidation catalyst of the present invention can effectively absorb and remove ozone or hydrogen peroxide remaining after wastewater-treatment, owing to a surface-reformer of the activated carbon and a surface-attachment agent used upon preparation of the above catalyst.

In addition, the present oxidation catalyst can be reused through sintering, and can efficiently treat wastewater, thus creating economic favor.

As for the catalyst of the present invention, the activated carbon is reformed in its surface and thus attachability of metals is increased, after which various metals are impregnated to the surface. Such a catalyst is advantageous in light of good durability, high catalytic action, so that it can perform an effective oxidation reaction, along with an oxidizing agent, thus decreasing color intensity, and effectively treating toxic and nonbiodegradable substances.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing an oxidation catalyst, comprising the following steps of:

reforming a surface of an activated carbon support with a tin compound;

impregnating metal elements to the surface of the support, to obtain a synthetic catalyst;

drying the synthetic catalyst; and sintering the dried synthetic catalyst.

2. The method as set forth in claim 1, wherein the impregnating step further comprises mixing metal elements with an aqueous solution or an organic solvent, and immersing the support into the mixed solution.

3. The method as set forth in claim 2, wherein a palladium compound or a phosphate compound, for use as a surface-attachment agent, is added to the mixed solution.

4. The method as set forth in claim 1, wherein the sintering step is carried out at 100–500° C. for 2 hours under air.

5. A method for recycling an oxidation catalyst, comprising the following steps of:

recovering the oxidation catalyst used for treatment of wastewater;

drying the recovered oxidation catalyst; and warming-up at 50–100° C. in a double boiler or sintering at 150–500° C. in a furnace the dried oxidation catalyst.

6. A method for treating wastewater using an oxidation catalyst, comprising the steps of:

mixing 10 L of leachate as raw wastewater with ozone as an oxidizing agent of 1 g/hr; and introducing the oxidation catalyst to the mixture, to remove organic matters and nitrogen.

7. A method for treating wastewater using an oxidation catalyst, comprising the steps of:

charging cyanide-containing wastewater, pH 10, and hydrogen peroxide as an oxidizing agent in a molar ratio of 1:1 to a batch reactor; and introducing the oxidation catalyst comprising an activated carbon support having a reformed surface incorporated with 2 g/L of Fe to the reactor, to remove cyanide at room temperature (20° C.) under atmospheric pressure (1 atm).

8. A method for treating wastewater using an oxidation catalyst, comprising the steps of:

filling the oxidation catalyst comprising an activated carbon support having a reformed surface impregnated with 2 wt % of Fe into a reactor; and adding colored wastewater and hydrogen peroxide as an oxidizing agent to the reactor, to remove organic matters and decrease color intensity.

* * * * *